Nov. 28, 1933.  A. H. OELKERS  1,937,293
LATERAL MOTION JOURNAL BOX
Filed April 24, 1929   2 Sheets-Sheet 2
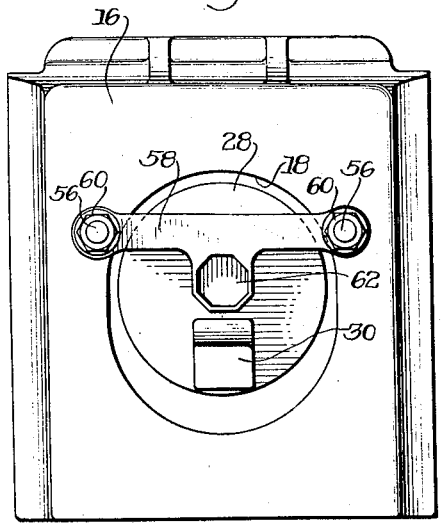
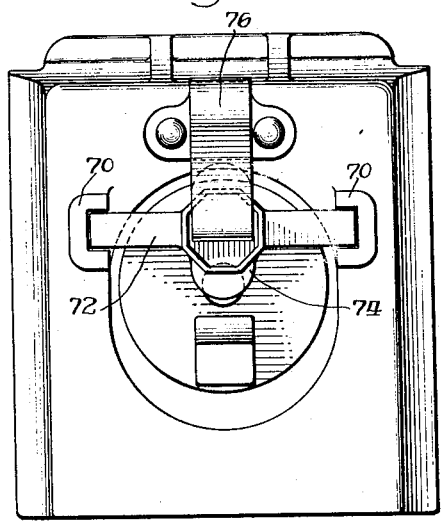
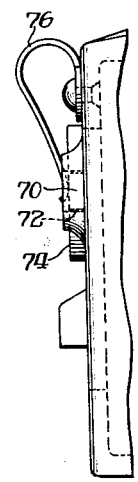
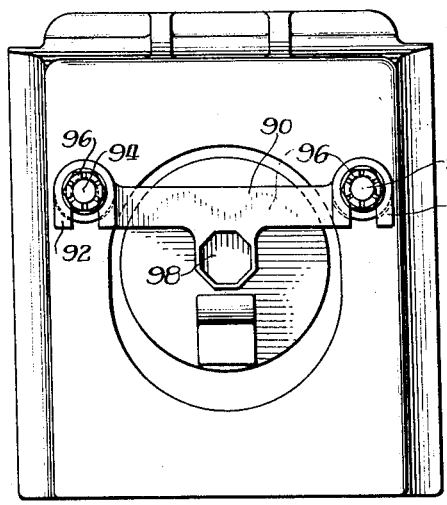
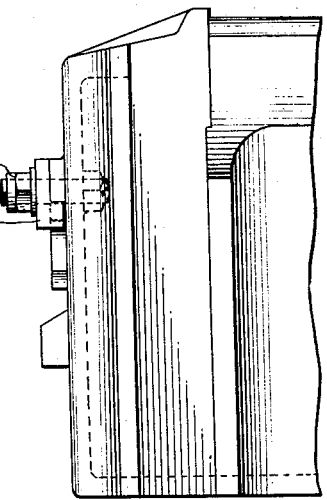
Inventor:
Alfred H. Oelkers.
By Wilkinson, Huxley, Byron & Knight
Attys Patented Nov. 28, 1933

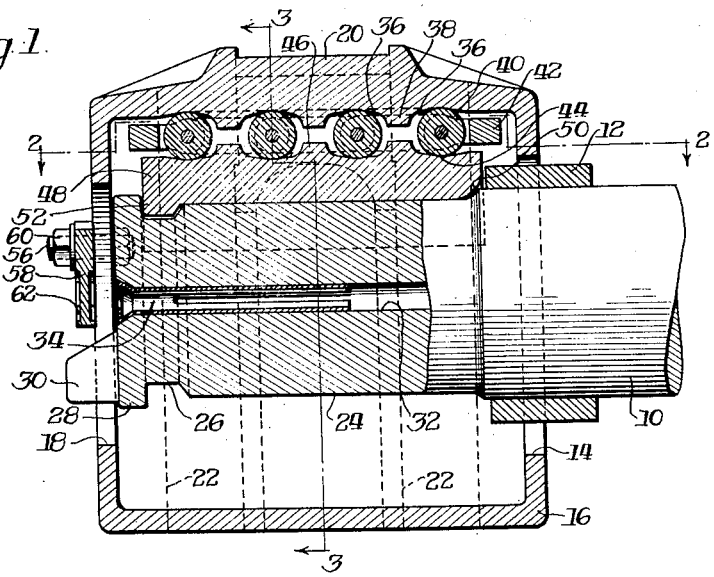

1,937,293

UNITED STATES PATENT OFFICE 1,937,293

LATERAL MOTION JOURNAL BOX

Alfred H. Oelkers, Chicago, Ill., assignor to American Steel Foundries, Chicago, Ill., a corporation of New Jersey Application April 24, 1929. Serial No. 357,628

9 Claims. (Cl. 308—180)

This invention pertains to lateral motion journal boxes and particularly to that type of device adapted for use with roller bearing wheel and axle assemblies.

In the different uses of railway rolling stock, there is a tendency for the body of the vehicle to shift laterally with respect to the wheel and axle assemblies; an example of which is that railway car bodies tend to swing laterally when rounding a curve, the suddenness and force of the lateral movement serving to increase the weight and consequently the strain on the outer wheels, thus communicating a severe strain to the flanges of these wheels which through contact with the rails resist the lateral movement of the cars. It is therefore necessary that a car truck should comprise parts capable of slight lateral movement in order that the lateral spring of the ends of the cars supported by the trucks may not force the wheel flanges against the rail heads with sufficient force to subject these flanges to excessive wear or to cause the wheels to be derailed. In some types of car trucks, the wheel flanges have been protected from excessive lateral strain by supporting the truck bolster upon the side frames in such a manner that the bolster is permitted lateral movement relative to the side frames which reduces or gradually absorbs the lateral force of the car ends before it is wholly communicated to the wheel flanges. Car trucks have also been designed in which the journal boxes are mounted in the side frames in such a manner as to yield laterally, and during this lateral yielding to exert a lifting movement on the side frames and through them upon the cars to thereby resist the lateral movement of the car. There have also been provided anti-friction rollers disposed between the rotary axle and the journal box, permitting lateral motion between the journal box and the rotary axle.

With the advent of roller bearing wheel and axle assemblies, another problem is presented in that it is oftentimes desirable to make some provision for permitting relative movement between the journal boxes and the fixed axle and to permit this lateral movement with as little friction as possible within the box on which the truck equalizers are carried. Of course, with the use of friction bearings, it is desired to provide carrying space in the journal boxes for as much lubricant as can be carried, but with the fixed axle, it is preferred that little or no lubricant be supplied to the surface between the axle and the bearer so that there is a condition produced which does not permit full lateral floating of the axle as obtained with the friction bearings. It will therefore be seen that there is an entirely different combination of conditions presented with the anti-friction type of bearing assembly and the friction type of assembly.

It is therefore an object of this invention to provide an anti-friction device for permitting lateral movement of the roller bearing unit within the journal box.

Another object is to provide an anti-friction bearing permitting lateral movement of the roller bearing unit within the journal box, together with an emergency bearing which will permit the inner axle of the roller bearing to revolve within the journal box in case of roller bearing failure.

Still another object is to provide a journal box in which lateral movement may take place between the box and the journal bearing, during which lateral movement between the journal box and bearing there is provided means whereby there is a sufficient relative movement between the journal box and axle in a direction to sufficiently push the lateral movement of the car body to thereby protect the wheel flanges from injury and wear.

A further object is to provide means associated with the journal box and normally stationary axle of a roller bearing assembly which normally permits a limited rotary movement of the normally stationary axle, the means being of such character as to indicate the failure of the anti-friction bearings of the assembly.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary sectional side elevation through a stationary axle and journal box, showing an embodiment of the invention;

Figure 2 is a fragmentary sectional top plan view of the assembly illustrated in Figure 1, the same being taken substantially in the plane as indicated by the line 2—2 of Figure 1;

Figure 3 is a sectional end elevation of the assembly illustrated in Figure 1, the same being taken substantially in the plane as indicated by the line 3—3 of Figure 1;

Figure 4 is an end elevation of the journal box and axle assembly, showing one form of stop and indicating means applied thereto;

Figure 5 is an end elevation of the journal box and axle assembly, showing another form of stop and indicating means applied thereto;

Figure 6 is a fragmentary side elevation of the modified form of indicating means illustrated in Figure 5;

Figure 7 is an end elevation of the journal box and axle assembly, showing still another form of stop and indicating means applied thereto; and Figure 8 is a fragmentary side elevation of the form shown in Figure 7.

Referring first of all more particularly to Figures 1 to 3 inclusive, an inner normally non-rotative axle 10 of an anti-friction wheel and axle assembly, as illustrated in application Serial No. 182,734, filed April 11, 1927, by Alfred H. Oelkers, for Anti-friction wheel and axle construction, is provided with a shrunk-on or press fitted collar 12 for locking the roller bearing unit (not shown) in its operative position. The axle 10 extends through aperture 14 and into the journal box 16, terminating adjacent an aperture 18 provided in the opposite or outer end thereof, the journal box 16 being provided with the equalizer seat 20 and channeled side portions 22, providing means for mounting the journal box housing within the pedestals of a truck frame. The inner axle 10 is provided with a smaller bearing portion 24 having a channeled portion 26 provided adjacent the end thereof and is also provided with an end collar 28 formed or provided with a lug 30 extending outwardly through the opening 18. The inner axle is also provided with a lubricant conduit 32 preferably disposed on the longitudinal center line of the axle 10 extending from the outer end of the axle to a point where it communicates with the lubricant recess for the anti-friction bearings (not shown) of the axle assembly, said channel 32 being normally closed by plug 34.

The upper inside surface of the journal box 16 is formed with roller surfaces 36 separated by ridges 38 communicating with said surfaces 36 by an arcuate surface, the projections being formed to limit the travel of rollers 40 mounted on a cage 42 and cooperating with the surfaces 36 and corresponding surfaces 44 separated by corresponding projections 46 formed on a bearer member 48 through which the weight is transmitted from the journal box to the axle 10. The bearer member 48 is provided with an arcuate end portion 50 limiting the movement of the bearer member inwardly and is also provided with a depending lug portion 52 retained in the channel 26 to prevent relative movement longitudinally between the bearer member and the axle 10. The journal box is provided with depending inwardly projecting members 54 formed on the inside thereof and having cooperative relation with respect to the cage 42 and the bearer 48 to retain these members in operative position with respect to the inner axle and the journal box.

When this assembly is in operation when the railroad car moves so that the journal box moves vertically in the pedestals of the truck frame, parts of the assembly will still function as designed, and should any lateral movement take place between the journal box and the inner axle 10, this will be permitted by the roller bearings 40 until said bearings are arrested by the projections 38 or 46, the bearings tending to ride up the arcuate surfaces thereof to impart vertical movement between the axle 10 and the journal box, thereby retarding the lateral movement which is finally retarded by the projections themselves.

The journal box may be provided with studs 56 for receiving the bar 58 extending therebetween and fastened by the bolts 60, said bar being disposed directly over the lug 30 projecting from the axle and provided with a downwardly projecting portion 62 covering the plug 34 of the lubricant channel 32. The bar it will be seen permits a movement of substantially 90° in either direction (that is, a total movement of substantially 180°) of the inner axle, at which time the lug 30 contacts the bar 58. If however the anti-friction bearings of the wheel and axle assembly should fail, sufficient torque is developed by the axle 10, causing the axle to revolve to break the bar 58, whereupon the bearer 48 becomes a frictional journal bearing riding on the bearing portion 24 of the axle 10 in a manner similar to the friction journal bearings in common use, and as the fragile bar 58 is placed on the outside of the journal box, an effective indicator is provided to show car inspectors or repairmen that the normally stationary axle has revolved.

In the modification of the bar shown in Figures 5 and 6, the journal box is provided on its outside with substantially U-shaped retaining members 70 facing each other and being adapted to straddle the bar 72, which bar is also provided with a depending portion 74 for preventing pulling of the plug 34 of the axle 10. In this case, the bar 72 is retained in its operative position within the member 70 by means of the spring 76.

In the modification shown in Figures 7 and 8, the bar 90 is provided with bifurcated ends 92 adapted to slip over the studs 94, the bar being secured by means of the nuts 96. This bar is likewise provided with a depending portion 98 for preventing removal of the plug in the lubricant channel but by means of this method only a slight loosening of the nuts 96 is necessary for the removal or replacement of the bar 90.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a device of the character described, the combination of a journal box, a normally non-rotative axle extending into said journal box and having an end thereof adjacent the outside of said journal box, a lug on said axle extending outwardly of said journal box, retaining means disposed on said journal box, a member held in cooperative engagement with said retaining means by resilient means to form a stop for said lug, said member being adapted to be broken by rotation caused by excessive torque of said axle to thereby indicate the existence of said torque.

2. In a device of the character described, the combination of a journal box, a normally non-rotative axle extending into said journal box and having an end thereof adjacent the outside of said journal box, a lug on said axle extending outwardly of said journal box, said axle having a lubricant channel therein normally closed by a plug, retaining means disposed on said journal box, a member held in cooperative engagement with said retaining means by resilient means to form a stop for said lug, said member having a portion extending over said plug to prevent removal thereof and said member being adapted to be broken by rotation caused by excessive torque of said axle to thereby indicate the existence of said torque.

3. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, substantially U-shaped facing sockets disposed on said journal box, and a bar disposed in said sockets adapted to be contacted by said lug to restrict creeping of said axle, said lug being adapted to break said bar when excessive torque rotates said axle.

4. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, substantially U-shaped facing sockets disposed on said journal box, a bar disposed in said sockets adapted to be contacted by said lug to restrict creeping of said axle, said lug being adapted to break said bar when excessive torque rotates said axle, and a resilient member mounted on said journal box and adapted to contact said bar to maintain it in said sockets.

5. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, substantially U-shaped sockets disposed on said journal box, a bar disposed in said sockets adapted to be contacted by said lug to restrict creeping of said axle, said lug being adapted to break said bar when excessive torque rotates said axle, and a resilient member mounted on said journal box and adapted to contact said bar to maintain it in said sockets.

6. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, said journal box being provided with fastening means on each side of said opening, a bar extending across said opening adapted to be contacted by said lug to restrict creeping of said axle, said lug being adapted to break said bar when excessive torque rotates said axle, said bar having portions embracing said fastening means whereby said bar is retained on said box.

7. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, said journal box being provided with fastening means on each side of said opening, a bar extending across said opening adapted to be contacted by said lug to restrict creeping of said axle, said lug being adapted to break said bar when excessive torque rotates said axle, said bar having U-shaped portions embracing said fastening means whereby said bar is retained on said box.

8. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, said journal box being provided with fastening means on each side of said opening, a bar extending across said opening adapted to be contacted by said lug to restrict creeping of said axle, said lug being adapted to break said bar when excessive torque rotates said axle, said bar having U-shaped portions embracing said fastening means whereby said bar is retained on said box, said bar being above the center line of said axle, said U-shaped portions being depending and provided with lugs engaging said fastening means preventing dissociation therefrom.

9. In a device of the character described, the combination of a journal box having an opening in the outer end thereof, a normally non-rotative axle of a wheel and axle assembly extending into said journal box and disposed in supporting relation thereto, said axle being provided with a lug extending outwardly of the opening in said journal box, said journal box being provided with fastening means on each side of said opening, a bar extending across said opening adapted to be contacted by said lug to restrict creeping of said axle, said lug being adapted to break said bar when excessive torque rotates said axle, said bar having U-shaped portions embracing said fastening means whereby said bar is retained on said box, said U-shaped portions being depending and provided with lugs engaging said fastening means preventing dissociation therefrom.

ALFRED H. OELKERS.